United States Patent [19]

Drauz et al.

[11] Patent Number: 4,760,199
[45] Date of Patent: Jul. 26, 1988

[54] PROCESS FOR THE PRODUCTION OF NON-AQUEOUS HYDROGEN PEROXIDE SOLUTIONS AND THEIR USE

[75] Inventors: Karlheinz Drauz, Freigericht; Axel Kleemann, Hanau, both of Fed. Rep. of Germany

[73] Assignee: Degussa Aktiengesellschaft, Frankfurt am Main, Fed. Rep. of Germany

[21] Appl. No.: 81,366

[22] Filed: Aug. 4, 1987

Related U.S. Application Data

[62] Division of Ser. No. 648,137, Sep. 7, 1984, Pat. No. 4,686,010.

[30] Foreign Application Priority Data

Sep. 27, 1983 [DE] Fed. Rep. of Germany ....... 3334854

[51] Int. Cl.$^4$ .............................................. C07C 37/60
[52] U.S. Cl. .................................... 568/771; 568/803; 252/186
[58] Field of Search ................. 568/771, 803; 252/186

[56] References Cited

U.S. PATENT DOCUMENTS

| | | | |
|---|---|---|---|
| 4,533,766 | 8/1985 | Drauz et al. | 568/771 |
| 4,551,562 | 11/1985 | Drauz et al. | 568/771 |
| 4,564,514 | 1/1986 | Drauz et al. | 423/589 |
| 4,590,305 | 5/1986 | Drauz et al. | 568/771 |
| 4,618,730 | 10/1986 | Drauz et al. | 568/771 |
| 4,628,126 | 12/1986 | Drauz et al. | 568/771 |
| 4,686,010 | 8/1987 | Drauz et al. | 423/63 |

OTHER PUBLICATIONS

Organic Reactions, vol. 7, pp. 388–398 (1953).

Primary Examiner—Werren B. Lone
Attorney, Agent, or Firm—Cushman, Darby & Cushman

[57] ABSTRACT

The production of solutions of hydrogen peroxide in phenol or its derivatives, e.g. hydrocarbyl substituted phenols, halo substituted phenols or phenol ethers, is carried out in a single step. Practically no loss of hydrogen peroxide occurs since a total distillation of hydrogen peroxide together with phenol or phenol derivative is avoided. Simultaneously the solutions obtained are practically free from water. The mixture of phenol or phenol derivative and aqueous hydrogen peroxide is treated with a material that boils below the boiling point of hydrogen peroxide, phenol or phenol derivative or forms an azeotrope with water that boils below the boiling point of hydrogen peroxide, phenol or phenol derivative and the water removed as an azeotrope. The solution of hydrogen peroxide in phenol or phenol derivative which remains behind is suitable for carrying out oxidation reactions and above all, also for hydroxylation reactions. The latter as especially advantageously carried out in the presence of sulfur-, selenium-, or tellurium oxide.

5 Claims, No Drawings

PROCESS FOR THE PRODUCTION OF NON-AQUEOUS HYDROGEN PEROXIDE SOLUTIONS AND THEIR USE

This is a division of application Ser. No. 648,137 filed Sept. 7, 1984, now U.S. Pat. No. 4,686,010.

CROSS REFERENCE TO RELATED APPLICATION

Drauz et al U.S. application Ser. No. 510,162 filed July 1, 1983 discloses the preparation of practically water-free organic solvent solutions of hydrogen peroxide by preparing a mixture of (1) aqueous hydrogen peroxide, (2) a solvent which forms a azeotrope with water that boils below the boiling point of hydrogen peroxide and (3) a higher boiling organic solvent and then distilling off the solvent which forms the low boiling azeotrope to remove the water and form a solution of hydrogen peroxide in the higher boiling organic solvent. As the high boiling solvent there are disclosed phosphorus compounds, e.g., phosphates, aromatic carboxylic esters, carboxylic acid amides, lactams and tetraalkyl ureas. The entire disclosure of the prior Drauz et al application Ser. No. 510,162 is hereby incorporated by reference and relied upon, especially in regard to the solvents forming low boiling azeotropes with water that are mentioned insofar as they are also suitable for use in the present invention.

BACKGROUND OF THE INVENTION

Non-aqueous solutions of hydrogen peroxide in various organic solvents as is known are employed in many reactions, e.g. oxidations, epoxidations or in nuclear (ring) hydroxylation of phenols. Since the presence of water has s disturbing influence on the reactions mentioned, there have already been attempts to obtain organic solutions of hydrogen peroxide whih have as low a water content as possible, see Organic Reactions, Vol. 7, page 395 (1953); German Pat. No. 2038319, German Pat. No. 2038320, German AS No. 2410742, German AS No. 2462957, and German AS No. 2462990.

However, difficulties appeared in the production of these types of solutions since the water content of the solutions was too high and besides there occurred a significant loss of hydrogen peroxide by entrainment during the distillation of water and through decomposition in the sump,, see German Pat. Nos. 2038319 and 2038320.

If phenol or its derivatives are used as solvent then hydrogen peroxide, which already is present in an organic solvent having a boiling point above phenol or its derivatives and above hydrogen peroxide, would distill off together with phenol or its derivatives from the high boiling solvent.

Thus it is known according to German AS No. 2462957 to produce a solution of hydrogen peroxide in phenol in the manner that there is added in a column to phenol which is distilling overhead a solution of hydrogen peroxide in a high boiling solvent such as an ester of phosphoric acid,, e.g. in triisooctyl phosphate, which solution has a low water content, and to distill off the overhead in a vacuum at a head temperature of about 75° C., the phenol together with the hydrogen peroxide. Hereby the entire amount of hydrogen peroxide goes over with the phenol. There is described in German AS No. 2462990 a corresponding process for phenol derivatives.

Thus there is a two-step process for the production of the desired solution,, namely the product of a hydrogen peroxide solution in an ester of phosphoric acid, and then the conversion of this solution into a solution of hydrogen peroxide in phenol.

Additionally in the second step the hydrogen peroxide must be completely distilled off and therefore it is present for a long time at elevated temperature. Through this there is not only the danger of decomposition and therewith a loss of hydrogen peroxide but in this total vaporization there are formed additional sensitive gas mixtures which contain the hydrogen peroxide in vapor form.

SUMMARY OF THE INVENTION

Therefore it is the task of the process of the invention to produce a solution of hydrogen peroxide in phenol or a phenol derivative while avoiding these disadvantages. Under the term phenol derivatives there is meant alkyl derivative such as the cresols, e.g. p-cresol, o-cresol, m-cresol, ethylphenol, e.g. p-ethylphenol, or butyl phenol, e.g. p-butyl phenol or m-butyl phenol, hexyl phenol, e.g. p-hexylphenol, xylenol, e.g. p-xylenol, p-isooctyl phenol, aryl phenols such as 4-hydroxydiphenyl and 2-hydroxydiphenyl, alkoxy phenols such as anisole and its aryl and halogen derivatives, phenyl ethyl ether, phenyl isopropyl ether, p-cresyl methyl ether, phenyl butyl ether, methyl ether of 4-hydroxydiphenyl, p-chlorophenol, o-chlorophenol, 2,4-dichlorophenol, p-fluorophenol, p-chlorophenyl methyl ether.

It has now been found that solutions of hydrogen peroxide in phenol or a phenol derivative can be produced in a single step and without decomposition of hydrogen peroxide and without the danger of forming explosive vapor mixtures, which solutions simultaneously are practically free from water if the phenol or phenol derivative and aqueous hydrogen peroxide are mixed with a solvent or mixture of solvents whose boiling point at normal pressure is below that of hydrogen peroxide and phenol or the phenol derivative, which furthermore forms sufficiently homogeneous solutions with these two components and only forms one or more azeotropes with water whose boiling point is below that of hydrogen peroxide, phenol or the phenol derivative, which furthermore is inert to hydrogen peroxide and phenol or the phenol derivative and can be easily separated from the solution formed of hydrogen peroxide in phenol or the phenol derivative, as a result of which the water can be distilled off as an azeotrope with the solvent at normal pressure, in a vacuum or at superatmospheric pressure and there is obtained in the sump a practically water-free solution of hydrogen peroxide in phenol or phenol derivative.

It is desirable for the phenol or phenol derivative to be present and then to lead in the solvent and aqueous hydrogen peroxide.

The solvents are selected so that sufficient aqueous hydrogen peroxide dissolves that the water present can be drawn off. This is understood by the expression "sufficiently homogeneous". It can be determined by a preliminary experiment.

In most cases the distillation itself is first carried out at atmospheric pressure to remove the water as an azeotrope and to remove the main amount of solvent, the residual solvent can be removed at non-critical, slightly reduced pressure, such as e.g. with phenol up to 100 mbar.

If the boiling point of the azeotrope and the hydrogen peroxide are close together, then the distillation can be carried out first also at slightly superatmospheric pressure, e.g. up to 3 bar.

Preferred solvents are halogenated, aliphatic, low boiling hydrocarbons such as dichloromethane, trichloromethane, fluorotrichloromethane, dichlorodifluoromethane. Dichloromethane is preferred. Furthermore, there can be used low boiling ethers such as diethyl ether, methyl isopropyl ether, methyl-tert. butyl ether, diisopropyl ether.

Hydrogen peroxide is added in aqueous solutions of 3 to 90 weight % hydrogen peroxide, preferably 30–85 wt. %. Solutions weaker than 3 wt. % are uninteresting industrially because of the very large amounts of water to be removed as an azeotrope. Higher concentrated solutions such as 90 wt. % can give occasion to the formation of sensitive mixtures.

The solutions of hydrogen peroxide in phenol or phenol derivative are practically free of water. Their water content in every case is below 1 wt. %, preferably below 0.5 wt. %, down to 0.01 wt. %.

The solutions produced according to the invention can be employed for various purposes, such as e.g., for oxidation reactions.

It has proven especially favorable in the hydroxylation of the ring of phenol and its derivatives which now can be carried out simply with the solutions of hydrogen peroxide in phenol or phenol derivatives obtained according to the invention in the presence of a catalyst of the formula $XO_2$ in which X indicates sulfur, selenium or tellurium.

Thus in this form of hydroxylation of the ring the compound to be hydroxylated is used itself as the solvent for hydrogen peroxide.

The ring hydroxylation reaction occurs at a temperature of 20° to 200° C. The preferred temperature when using sulfur dioxide as catalyst is at 120° to 180° C. and when using selenium dioxide is between 100° and 170° C.

The pressure range used is not critical, generally normal pressure is used although it is possible to use either reduced pressure or superatmospheric pressure, e.g. superatmospheric pressure up to 2 bar.

Sulfur dioxide can be used both in the gaseous form and in the dissolved form. As solvent there also can be used besides the solvent for the hydrogen peroxide solution, i.e. phenol or phenol derivative, alkyl or cycloalkyl esters of saturated, aliphatic carboxylic acids which have a total of 4–8 carbon atoms, above all, n-propyl acetate, isopropyl acetate and ethyl acetate. Examples of esters of formic acid include, the propyl esters to the hexyl esters, e.g. propylformate, isopropylformate, n-butylformate, amylformate.

Of acetic acid: the ehtyl ester to the hexyl ester, e.g., ethyl acetate, propyl acetate, isopropyl acetate, butyl acetate, sec. butyl acetate, amyl acetate, and hexyl acetate.

Of propionic acid: the methyl ester to the pentyl ester, e.g., methyl propionate, ethyl propionate, propyl propionate, isopropyl propionate, butyl propionate, and amyl propionate.

Of butyric acid: the methyl ester to the butyl ester, e.g., methyl butyrate, ethyl butyrate, propyl butyrate, and butyl butyrate.

Of valeric acid: the methyl to the propyl ester, e.g. methyl valerate, ethyl valerate, propyl valerate, and ispropyl valerate.

Of caproic acid: methyl caproate and ethyl caproate.

There also can be used methyl pivalate and ethyl pivalate.

Included in the esters are all of the branched chain isomers, e.g., in addition to those mentioned above, t-butyl acetate and t-butyl propionate.

Illustrative cycloalkyl esters are cyclohexyl acetate, cycloamyl acetate, cycloamyl propionate, and cyclopropyl acetate.

It is also possible to employ mixtures of the above-mentioned esters.

There can also be employed methylene chloride as a solvent. Additionally there can be used dialkyl ethers. Illustrative of such compounds include ethers such as diethyl ether, dimethyl ether, diisopropyl ether, methyl ethyl ether.

The concentration of this sulfur dioxide solution is generally 0.5 to 50 % Wt. %, preferably 1 to 10 wt. %. Freshly produced solutions of sulfur dioxide, which thus are free from water and byproducts such as alkyl sulfonates, are especially favorable.

The catalyst sulfur dioxide is employed in very small amounts, i.e. in amounts of 0.0001 to 0.1 mole, preferably from 0.0005 to 0.01 mole, based on 1 mole of hydrogen peroxide. This is extremely small compared to the previously used amounts of strong mineral acids. The ratio of pyrocatechol to hydroquinone or that of the two possible ortho substitution products can be influenced by the use of selenium dioxide as catalyst. Thus the ratio of pyrocatechol to hydroquinone varies between 5:1 to 1:1 although the theoretical ratio is 2:1.

In substituted phenols if the para position to the OH group is occupied by a substituent, e.g. a methyl group then the second hydroxyl group can enter either ortho to the first OH group or ortho to the $CH_3$ group. The resulting products are then pyrocatechol or resorcinol substituted in the 4-position.

It is now possible to establish the ratio of the two ortho-hydroxylation produccts at about 5:1 to 80:1, based on the ortho position to the first hydroxyl group.

Selenium dioxide is employed in solid form, preferably as powder, in an amount of 0.0001 to 5 moles, preferably from 0.0005 to 0.2 mole, based on 1 mole of hydrogen peroxide. It can also be used in dissolved form, e.g. as a solution in phenol or the phenol derivative. The concentration of such a solution is 0.1 to 10 wt. %. The solutions of hydrogen peroxide in phenol or phenol derivative employed can be varied in such manner that the molar ratio of phenol or phenol derivative to hydrogen peroxide is 5 to 20:1, preferably 5 to 15:1. The reaction times are short both in using sulfur dioxide and selenium dioxide. At a reaction of 99% they practically do not exceed 30 minutes. If sulfur dioxide is employed as catalyst then the reaction is even practically finished after 10 minutes.

The nuclear (ring) hydroxylation of phenol or phenol derivative which is carried out with the catalyst sulfur dioxide or selenium dioxide can be carried out very simply by using the solutions of hydrogen peroxide in the compounds to be reacted which solutions are produced according to the invention.

Unless otherwise indicated, all parts and percentages are by weight.

The process can comprise,, consist essentially of, or consist of the stated steps with the recited materials.

DETAILED DESCRIPTION

Example 1

Production of A Water-Free Solution of $H_2O_2$ In Phenol According To The In Situ Method

There were added successively to 387.0 grams of phenol 700.0 grams of dichloromethane and 30.0 grams of a 70.0 weight % aqueous hydrogen peroxide solution ($\hat{=}21.0$ grams $H_2O_2$).

At normal pressure and a head temperature of 38°–41° C. there were distilled off 9.1 grams of water over a water separator. The sump temperature reached a maximum of 71° C. Subsequently there were distilled off first at normal pressure, then at 500 mbar 698.1 grams of dichloromethane. The content of $H_2O_2$ in the dichloromethane (methylene chloride) was 0.04 wt. %. There remained in the sump 406.2 grams of a 5.02 wt. % solution of $H_2O_2$ in phenol having a water content below 0.5 wt. %.

Example 2

A water-free solution of 3.40 grams of $H_2O_2$ (0.1 mole) in 94.1 grams of phenol (1 mole) was heated to 90° C. There was added to the stirred solution 0.095 ml of a 24 wt. % solution of $SO_2$ in isopropyl acetate. The temperature in the reaction mixture after that increased to 143° C. After the exotherm subsided after 5 minutes there was established a hydrogen peroxide reaction of 95.7%. The reaction mixture then contained 5.78 grams (52.5 mmoles) of pyrocatechol and 2.37 grams (21.5 mmoles) of hydroquinone wihich corresponds to a total yield of dihydroxybenzenes of 77.3% based on the hydrogen peroxide reacted.

Example 3

A water-free solution of 6.80 grams of $H_2O_2$ (0.2 mole) in 97.0 grams of phenol (1.03 moles) was heated to 100° C. There was added to the stirred solution 0.17 gram of a 24 wt. % solution of $SO_2$ in isopropyl acetate. The temperature in the reaction solution thereupon increased to 170° C. After the exotherm subsided after 5 minutes there was established, a hydrogen peroxide reaction of 99.2%. The reaction mixture contained 9.67 grams (42.6 mmoles) of pyrocatechol and 5.24 grams (23.1 mmoles) of hydroquinone, which corresponds to a total yield of dihydroxybenzenes of 65.7%, based on the hydrogen peroxide reacted.

Example 4

Production Of A Water-Free Solution Of Hydrogen Peroxide In p-Cresol According To The In Situ Method

There were added successively to 400.0 grams of freshly distilled p-cresol 500 ml of dichloromethane and 30.0 grams of a 70.0 wt. % aqueous solution of $H_2O_2$ ($\hat{=}21.0$ grams $H_2O_2$). There were distilled off at a head temperature of 38°–41.5° C. 9.06 grams of water over a water separator. The sump temperature reached a maximum of 75° C. Subsequently there were distilled off first at normal pressure, then at 430 mbar 696 grams of dichloromethane. The content of $H_2O_2$ in the dichloromethane was 0.05 wt. %. There remained in the sump 419.9 grams of a 4.91 wt. % solution of $H_2O_2$ in p-cresol having a water content correspondingly small to that in Example 1.

Example 5

Production Of A Water-Free Solution Of Hydrogen Peroxide In 4-tert. Butylphenol

There were added successively to 300.0 grams of freshly distilled 4-tert.butylphenol 450 ml of dichloromethane and 25.0 grams of a 70.02 wt. % aqueous solution of $H_2O_2$ ($\hat{=}17.51$ grams $H_2O_2$). There were distilled off at a head temperature of 38°–41° C. 7.5 grams of water over a water separator. The sump temperature reached a maximum value of 79° C. Subsequently there were distilled off first at normal pressure, then at 350 mbar 418 grams of dichloromethane. The content of $H_2O_2$ in the dichlormethane was 0.06 wt. %. There remained in the sump 317.0 grams of a 5.36 wt. % solution of $H_2O_2$ in 4-tert. butylphenol having a water content which was very small corresponding to that in Example 1.

Example 6

An aqueous solution of 3.40 grams of $H_2O_2$ (0.1 mole) in 150.2 grams (1.0 mole) of 4-tert.butylphenol was heated to 90° C. and treated with 0.4 gram of a 4.8 wt. % solution of sulfur dioxide in isopropyl acetate. The temperature of the reaction solution increased in connection therewith to 159° C. After the exotherm subsided, after 10 minutes, there was determined a hydrogen peroxide reaction of 98.9%. There were then contained then in the reaction mixture 12.95 grams of 4-tert-.butylpyrocatechol which corresponds to a yield of 78.8% based on the reacted hydrogen peroxide.

Example 7

A water-free solution of 3.40 grams of $H_2O_2$ (0.1 mole) in 108.1 grams (1.0 mole) of p-cresol was heated to 95° C. and treated with 0.018 gram (0.00015 mole) of $SeO_2$. The temperature increased in connection therewtih to 161° C. After 15 minutes there was determined a hydrogen peroxide reaction of 99.4%. At that time there were formed in the reaction mixture 8.08 grams of 40-methylpyrocatechol, which corresponds to a yield of 65.5 mole %, based on the reacted $H_2O_2$. 4-Methyl-resorcinol was formed in an amount of 0.85 mole %.

Example 8

An aqueous solution of 3.40 grams of $H_2O_2$ (0.1 mole) in 94.1 grams (1.0 mole) of phenol was heated to 90° C. and treated with 0.022 gram (0.0002 mole) $SeO_2$.

The temperature in the reaction solution increased in connection therewith to 163° C. After 10 minutes there was ascertained a hydrogen peroxide reaction of 98%. The reaction mixture then contained 5.81 grams (52.8 mole %) of pyrocatechol and 1.31 grams (11.9 mole %) of hydroquinone,, which corresponds to a total yield of dihydroxybenzenes of 66.0% based on the $H_2O_2$ reacted. The ratio of pyrocatechol to hydroquinone is 4.43.

The entire disclosure of German priority application No. P 3334854.5 is hereby incorporated by reference.

What is claimed is:

1. A process for nuclear hydroxylation of a phenolic reactant selected from the group consisting of phenol, an alkyl phenol, an aryl phenol, a halophenol and on alkyl ether of said phenols, comprising the steps of:
    mixing (1) the phenol it reactant and (2) aqueous hydrogen perioxide with a solvent or mixture of solvents whose boiling point is below that of (1)

and (2) at normal pressure, wherein the solvent forms a sufficiently homogeneous solution with both (1) and (2) and only forms an azeotrope with water whose boiling point is below that of (1) and (2);

separating said solvent from the mixture of solvent, (1) and (2);

distilling off an azeotrope of the solvent and water, whereby a substantially water-free solution of hydrogen peroxide in the phenolic reactant (2) results: treating said substantially water-free solution with a catalyst of formula $XO_2$, wherein X is sulfur, selenium, or tellurium at temperature of 20°–200° C. and a ratio of phenolic reactant to hydrogen peroxide of 5 to 20.1.

2. A process according to claim 1 wherein the catalyst is $SO_2$.

3. A process according to claim 2 wherein the temperature is 120° to 180° C.

4. A process according to claim 1 wherein the catalyst is $SeO_2$.

5. A process according to claim 4 wherein the temperature is 100° to 170° C.

* * * * *